May 27, 1958  R. M. NEEL ET AL  2,835,961
INFLATION METHOD
Filed Jan. 5, 1956

INVENTORS:
ROBERT M. NEEL
ARNOLD P. LITMAN
By Lionel E. Goff + Robert F. Ruemeli
ATTORNEYS

United States Patent Office 2,835,961
Patented May 27, 1958

2,835,961

INFLATION METHOD

Robert Milton Neel, New Douglas, Ill., and Arnold P. Litman, Moline Acres, Mo., assignors to Olin Mathieson Chemical Corporation, East Alton, Ill., a corporation of Virginia Application January 5, 1956, Serial No. 557,512

2 Claims. (Cl. 29—157.3)

This invention relates to the inflation of articles between platens and more specifically to the inflation of forge welded panels having unjoined interior portions.

In the manufacture of hollow articles such as heat exchangers, radiators and containers by the process described in the patent to Grenell U. S. 2,690,002 issued September 28, 1954, the flat faces of two sheets of metal are forge welded together as by hot rolling after having a design of weld inhibiting material applied to one of these faces. The weld inhibiting material prevents bonding of the faces adjacent thereto. Following forge welding of the sheets the unjoined internal portion of the newly formed panel is inflated by fluid pressure introduced between the unjoined portions through a nozzle inserted into the unjoined interior portion of the panel. The usual practice in fabricating such plates is to provide a narrow unjoined strip interconnecting the desired hollow portion design of the plate with an edge of the plate, the nozzle being inserted into the unjoined edge portion of the strip.

It has been disclosed heretofore in a patent to Long U. S. 2,662,273 granted December 15, 1953, that forge welded panels of the aforementioned type may be inserted between flat restraining platens which are spaced apart the same distance as the desired tube height of the finished panel and the tube then inflated by applying a fluid pressure which is sufficiently high to rupture the panel if it were not restrained by the platens. The hollow portions of the panels thus formed in such a die are flat on their outer surfaces because of the deformation of the hollow portions by the platens during inflation. This process has the disadvantage that the sidewall of the tube which is unsupported during the inflation step at the high rupturing pressure becomes measurably thinner than the flat wall supported by the platens and thus has a lower strength.

It is therefore an object of this invention to provide an improved hollow article. Another object of this invention to provide the inflated hollow portions of bonded panels with flat surfaces while applying an inflation pressure below the rupture pressure. Another object of this invention is to obtain in such a process a tube wall thickness substantially the same in the flat and sidewall areas.

Figure 1:
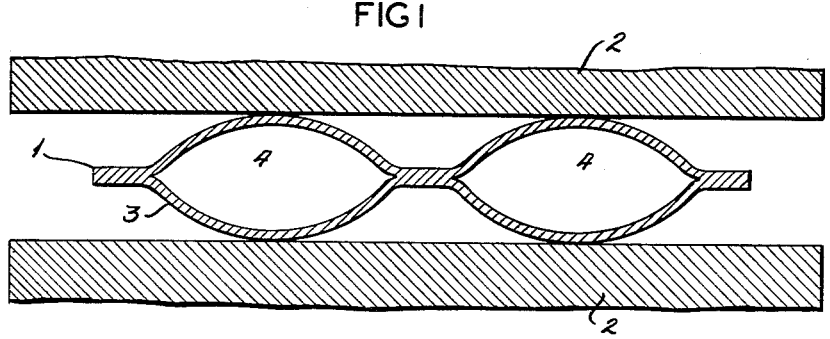
Figure 2:
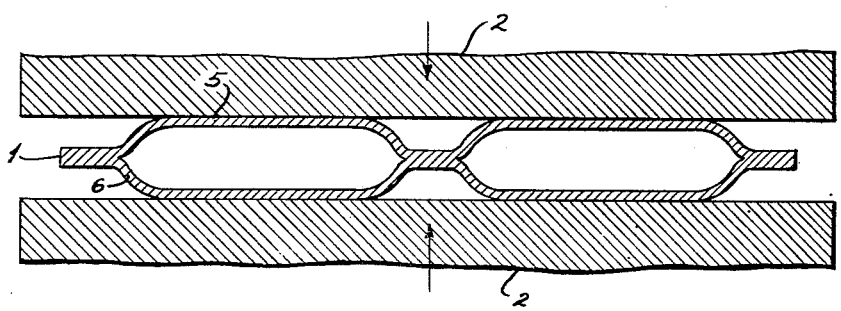

Additional objects and advantages will become apparent from the following description and drawings in which:

Figure 1 is a transverse sectional view of a panel after it has been inflated between a pair of platens; and Figure 2 is a transverse sectional view of the panel of Figure 1 after it has been compressed between the pair of platens.

A flat panel 1 having an unjoined closed interior portion is placed between flat platens 2 spaced apart a distance slightly less than the distance which the tube could normally be inflated at the given inflation pressure if it were not restrained by the platens. The unjoined portion of the panel may have any desired configuration. For example, it may have a configuration which upon inflation will provide a large unrestricted hollow expanse or a tube design. Referring to Figure 1, the unjoined portion of the panel is then inflated at the given pressure which is always less than the unrestrained rupture pressure of the panel forming a tube 3. As the tubes are inflated they engage the platens 2. Because of the low inflation pressure the engagement between the outer portions of the tubes and the platens will only slightly flatten the hollow portions of the panel. The platens assure that all portions of the tube inflate to substantially the same height and thereby serve as a height gauge. While the interior 4 of the inflated portion is still subjected to fluid pressure, the platens are brought closer together, as shown in Fig. 2, to reshape the tubes by flattening the outer surfaces 5.

By way of example, a panel fabricated from 2S—O aluminum having a tensile strength of 13,000 p. s. i., a yield strength of 5,000 p. s. i. at a 2% offset and a 20% to 25% minimum elongation in 2 inches for a .127 gauge for each sheet prior to bonding by the process described in the aforementioned patent, after bonding had a thickness of 0.060 of an inch, received a full anneal, and thereafter was inserted between flat steel platens spaced apart .210 inch. The unbonded portion of the panel was then inflated with a fluid pressure of 500 p. s. i., this being just below the rupture pressure in the absence of a die, which for this particular type panel was between 650–750 p. s. i. The unbonded portion was thereby inflated and engaged the steel platens but was only slightly flattened by the platens because of the relatively low expansion pressure. While maintained between the platens which were still spaced apart .210 inch the fluid pressure in the tubes was maintained at 500 p. s. i. and the platens were brought together until they were spaced apart .180 inch with the maximum internal fluid pressure being 750 p. s. i. after flattening of the tubes. As the platens were brought toward each other the outer portions of the inflated tubes were flattened producing a somewhat hexagonal cross sectional tube configuration. The pressure was then released and the inflated panel removed from between the platens.

By inflating the panel at pressures below the rupture pressure of the unrestrained panel the tops of the tubes are slightly flattened and minor variations in the width of the tubes is compensated for by restraining the wider portion of the panel which would normally inflate to a greater height while permitting the narrow portion of the tube to inflate into firm contact with the platens. The tube wall thickness was substantially the same in the sidewall and flat portions.

When the tubes of a hollow bonded panel are inflated below the rupture pressure of the panel and without the use of restraining platens they assume a substantially arcuate cross sectional configuration in which the ultimate height has a consistent relationship with the width of the hollow portion of the tube. The platens may therefore be spaced apart a distance just slightly less to the ultimate free inflation tube or hollow portion height. As the fluid pressure is applied to the internal unjoined portion of the panel the unjoined portion expands until it contacts the platens. When the panels are imprinted with the weld inhibiting material prior to forge welding of the sheets it commonly happens that all portions of the imprinted design are not of precisely the same width. When tubes having variations in width are inflated the wider part of the tube will inflate to a greater height than will the narrower part of the tube. By inflating between platens in the manner previously described these minor variations in tube width are not reflected into the ultimate tube height or thickness. The platens also act to prevent the bonded panel from warping during the inflation step because of the force of the platens on the inflated tubes.

By bringing the platens toward each other to compress the inflated panel the entire tube structure is exposed to higher but less than rupturing pressures and flattened simultaneously, rather than progressively by a high pressure fluid passing through the tube circuit or hollow portion from one end to the other. The strain to which the tubes are subjected is equalized since all portions of the tubes moved simultaneously thus eliminating to a great extent localized stresses at bends caused by the wedging action of high pressure fluid flowing through the tubes from one end to other.

It is to be understood that although the invention has been described with particular reference to hollow forge welded panels it is not to be so limited and that it is equally applicable to any hollow articles which are to be inflated by a fluid pressure. It is therefore to be expressly understood that this invention is not to be limited to the preceding description and embodiments except as set forth in the appendent claims.

We claim:

1. The process of forming hollow articles having a flattened tubular portion from a panel of ductile metal having an expandable unjoined interior portion continuously disposed within the panel periphery, said process comprising inserting the panel between oppositely opposed platens spaced apart by a distance substantially in excess of the final expanded heighth desired in said unjoined portion and inflating the unjoined portion of the panel by injecting into said unjoined portion a fluid pressure below the unrestrained rupture pressure of the panel until a continuous part of the unjoined portion engages both platens and then maintaining a fluid pressure below rupturing pressure within the inflated portion of the panel while subsequently decreasing the distance between the platens to compress the inflated portion to the desired heighth of expansion and provide a flat outer surface on said tubular portion, whereby all flat portions of the hollows are flattened simultaneously and the thickness of the flattened portion and adjacent side walls is substantially the same.

2. The process for manufacturing plate-like hollow articles comprising applying a pattern of a weld inhibiting material on the surface of a ductile metal sheet, placing a second ductile metal sheet over said imprinted surface and welding together the portions of the contiguous surface of the sheets which are not separated by said weld inhibiting material, inserting the bonded panel between oppositely opposed unrecessed platens spaced apart by a distance in excess of the final predetermined heighth of the finished hollow portion and inflating the unbonded portions of the panel to substantially final volume with a fluid pressure below the unrestrained rupture pressure of the panel until a continuous part of the outer extremities of the surfaces of the inflated hollow portion of the panel engage the platens and while maintaining a fluid pressure below rupturing pressure in the hollow portion of the panel subsequently decreasing the distance between the platens to simultaneously compress the expanded portion and form flat outer surfaces thereon to the final heighth of expansion desired, whereby the flattened portions and adjacent side walls connecting the edges of the flattened portions with the solid unexpanded portion of the panel have substantially the same thickness.

References Cited in the file of this patent

UNITED STATES PATENTS

| | | |
|---|---|---|
| 1,925,854 | Squires | Sept. 5, 1953 |
| 2,662,273 | Long | Dec. 15, 1953 |